(12) United States Patent
Iizuka et al.

(10) Patent No.: US 6,549,337 B2
(45) Date of Patent: *Apr. 15, 2003

(54) BINOCULARS HAVING OBJECTIVES SPACED APART AT A FIXED DISTANCE AND ADJUSTABLE EYEPIECES

(75) Inventors: Toshimi Iizuka, Yokohama (JP); Hidefumi Notagashira, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/585,927

(22) Filed: Jan. 16, 1996

(65) Prior Publication Data

US 2003/0043460 A1 Mar. 6, 2003

(30) Foreign Application Priority Data

Jan. 19, 1995 (JP) ............................... 7-025930

(51) Int. Cl.⁷ .......................... G02B 27/64; G02B 23/00
(52) U.S. Cl. ..................... 359/557; 359/407; 359/409; 359/554
(58) Field of Search ................. 359/478–482, 359/399, 402, 404–407, 409–413, 415, 425, 554–557, 831–837; 354/70, 430; 351/205–212

(56) References Cited

U.S. PATENT DOCUMENTS

| 1,267,592 A | * | 5/1918 | Reisinger | |
|---|---|---|---|---|
| 2,553,329 A | * | 5/1951 | Perkins | 359/835 |
| 2,780,142 A | * | 2/1957 | Bouwers | 359/831 |
| 3,049,972 A | * | 8/1962 | Malinowski | 359/413 |
| 3,819,255 A | * | 6/1974 | Matui | 359/836 |
| 3,871,750 A | * | 3/1975 | Mecklenborg | 359/834 |
| 4,013,339 A | * | 3/1977 | Ando et al. | 359/556 |
| 4,235,506 A | | 11/1980 | Saito et al. | 359/554 |
| 4,600,272 A | * | 7/1986 | Dost et al. | |
| 5,071,242 A | * | 12/1991 | Yanagisawa | 359/416 |
| 5,091,739 A | * | 2/1992 | Kawamura | 359/431 |
| 5,126,549 A | * | 6/1992 | Yamada | 359/407 |
| 5,170,255 A | * | 12/1992 | Yamada et al. | 359/554 |
| 5,282,082 A | * | 1/1994 | Espie et al. | 359/399 |
| 5,315,435 A | * | 5/1994 | Horiuchi | 359/554 |
| 5,483,376 A | * | 1/1996 | Takashima | 359/554 |
| 6,246,520 B1 | | 6/2001 | Iizuka | 359/557 |

FOREIGN PATENT DOCUMENTS

| JP | 57-37852 | | 8/1982 | |
|---|---|---|---|---|
| JP | 4342212 | | 11/1992 | |
| JP | 6-43365 | | 2/1994 | |
| JP | 118342 | * | 4/1994 | 359/478 |

* cited by examiner

Primary Examiner—Thong Nguyen
(74) Attorney, Agent, or Firm—Fitzpatrick, Cella, Harper & Scinto

(57) ABSTRACT

Binoculars have a pair of objective units for forming an image separated with a fixed spacing, a pair of erecting prism units for transforming the image received from the pair of objective units to an erect image, and a pair of eyepiece units. Each of the pair of erecting prism units has a Pechan roof prism having a roof face, a disparity existing between luminous flux center incident on each of said pair of erecting prisms and an optical axis along which light exits from each of said pairs of erecting prisms. Each one of the pair of prisms rotates around an optical axis of a corresponding one of the pair of objective units. The eyepiece units receive the erect image from the erecting prism units, respectively, with each of the pair of eyepiece units being rotatable around an optical axis of a corresponding one of the pair of objective units.

8 Claims, 6 Drawing Sheets

BINOCULARS HAVING OBJECTIVES SPACED APART AT A FIXED DISTANCE AND ADJUSTABLE EYEPIECES

BACKGROUND OF THE INVENTION

1. Field of the Invention

The present invention broadly relates to binoculars and more particularly, to binoculars in which two objectives are separated with a fixed spacing (the length of a ground line) so as to change the eyepiece width.

2. Description of the Related Art

Hitherto, large binoculars, in particular, are known as binoculars whose two objectives are spaced apart at a fixed distance.

In this type of large binoculars, the Porro I-type prisms shown in FIG. 5 or the Porro II-type prisms shown in FIG. 6 are mostly used as erecting prisms for adjustments of the eyepiece width. These types of prisms inevitably require a larger prism chamber used for storing the prisms therein when compared to roof prisms for use in small binoculars, but the above type of binoculars are not usually designed to be portable, whereby the size of the binoculars present almost no problem. Additionally, the use of the Porro prisms makes it easier to manufacture the binoculars than the use of roof prisms.

Further, in addition to the above type of large binoculars provided with two objectives separated across a fixed spacing, binoculars equipped with a specific function are known: for example, binoculars having a built-in autofocus function, as disclosed in Japanese Patent Laid-Open No. 4-342212, and binoculars having a built-in shake correcting function, as disclosed in Japanese Patent Publication No. 57-37852. In the former type of binoculars, the spacing between the eyepieces (eyepiece width) is changed by rotating the image inverting prisms and the eyepieces around the optical axes of the objectives, respectively. On the other hand, in the latter type of binoculars, rhomboid prisms are added as means for varying the spacing between the eyepieces, because of the use of roof prisms which achieves substantial linearity between the optical axis along which the incident light travels and the optical axis along which the exit light travels. The roof prisms are coming into frequent use even for ordinary binoculars with a view to achieving smaller and lighter-weight binoculars.

However, the above types of conventional binoculars using the Porro prisms encounter the following problems. As illustrated in FIGS. 7 and 8, the spacing between eyepieces 33 are kept to match the average gap between the user's eyes in order to maintain the distance between the optical axis along which a beam passes and impinges on the prism and the optical axis along which the beam passes and exits from each of the eyepieces 33 within certain values. With this arrangement, the objectives 31 should be located somewhere on the circumference having a radius indicated by R around the optical axis of the eyepiece 33, as shown in FIGS. 7 and 8. That is, the positional relationship between the objectives 31 and the eyepieces 33 and the arrangement of the prisms 32 cannot be totally flexible, but rather restricted in a certain manner. The same applies to the use of Porro II-type prisms.

Because of this problem, restrictions are further imposed on the arrangement of the optical system for use in the binoculars having a built-in shake correcting function, an autofocus function and so on, which hampers the downsizing of binoculars.

Additionally, when the Porro prisms, which require a larger prism chamber than the roof prisms, are used in binoculars provided with two objectives separated with a fixed spacing, the portions required for rotating the eyepieces and the prism chambers are enlarged, thereby hampering the ease of operation.

SUMMARY OF THE INVENTION

Accordingly, it is an object of the present invention to provide binoculars whose objectives are spaced apart at a fixed distance, in which the rotation of objectives is not employed for adjustments of the eyepiece width, and instead, a mere rotating operation of eyepiece portions can change the spacing between the eyepieces (eyepiece width), whereby the space of the entire main unit of the binoculars can be effectively utilized, thereby downsizing the overall binoculars containing possible added functions, for example, a built-in shake correcting function and an autofocus function.

It is another object of the present invention to provide binoculars in which adjustments of the eyepiece width can be made merely by the rotation of the Pechan roof prisms and the eyepieces, even with the use of roof prisms as erecting prisms, without requiring another type of optical member, such as rhomboid prisms.

It is still another object of the present invention to provide binoculars provided with objectives spaced apart at a fixed distance, in which a prism chamber for storing the Pechan roof prisms is made smaller, thereby enhancing the ease of operation.

It is a further object of the present invention to provide binoculars in which only one elastic member is required for performing easy and reliable locating and fixing of the respective prisms, which are comprised of the Pechan roof prisms, to a prism casing.

Further objects, features and advantages of the present invention will become apparent from the following description of the preferred embodiments with reference to the attached drawings.

DETAILED DESCRIPTION OF THE PREFERRED EMBODIMENT

Figure 1:
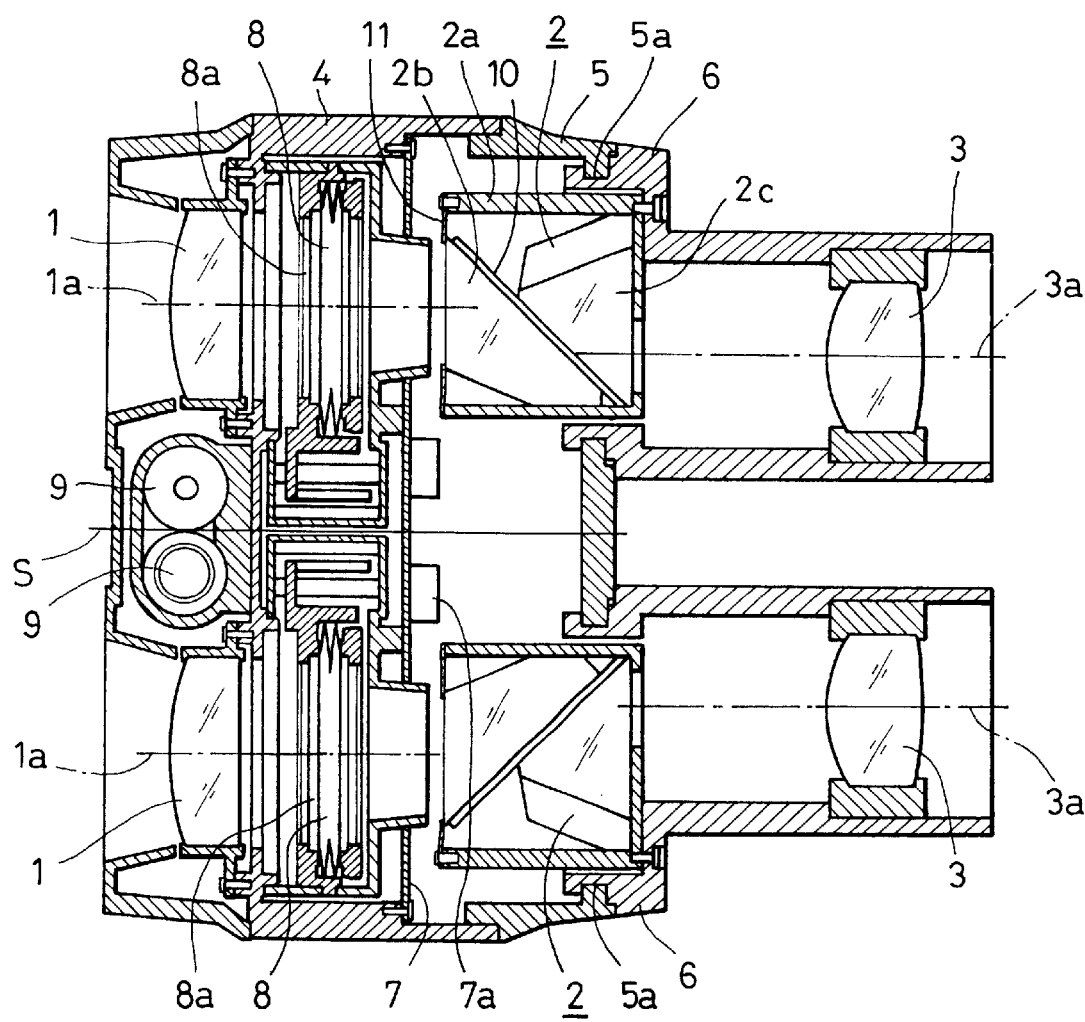
FIG. 1 is a cross sectional view of binoculars according to an embodiment of the present invention.
Figure 2:
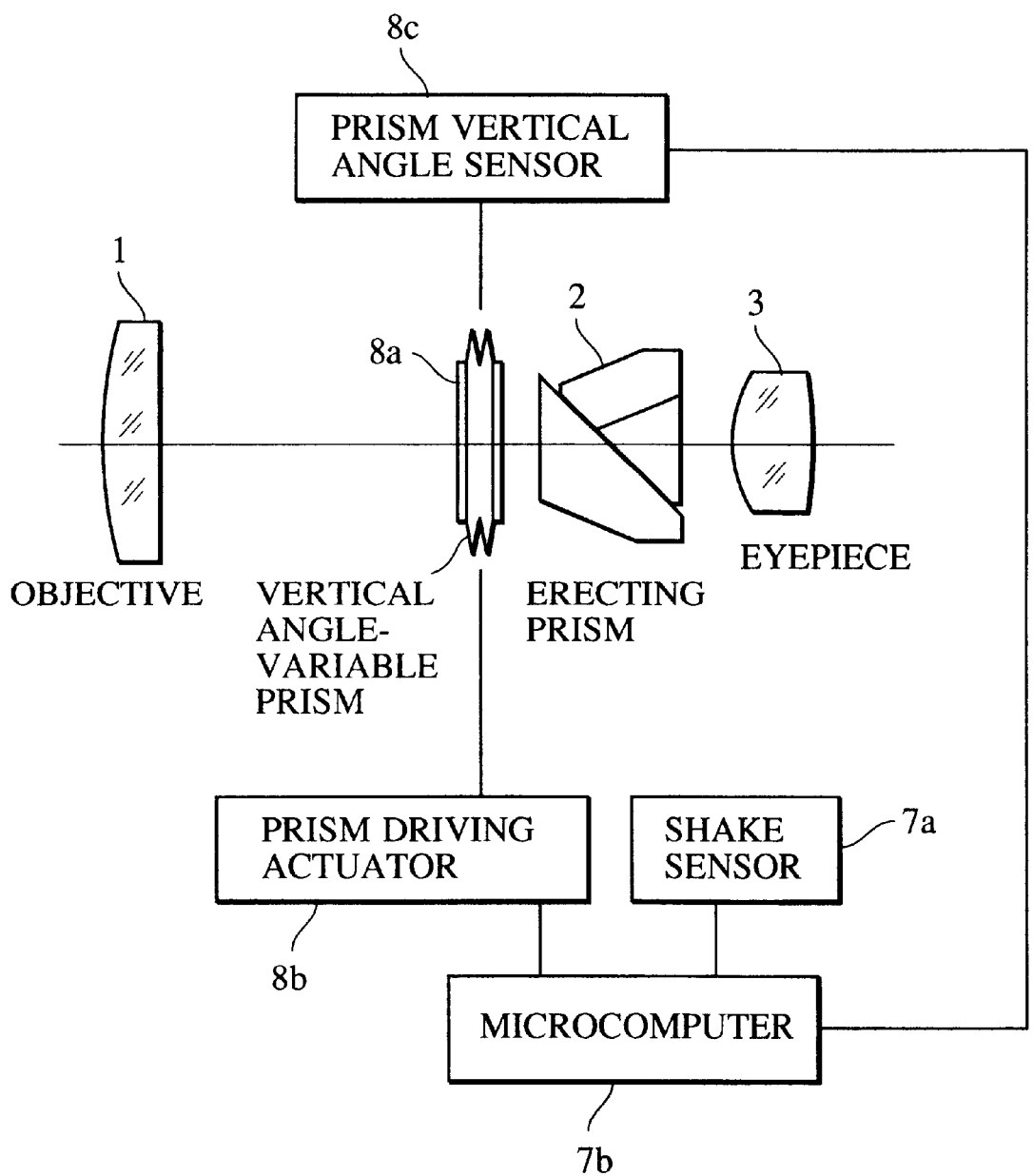
FIG. 2 is a block diagram of the construction of a shake correction system employed in the binoculars according to the same embodiment.
Figure 3:
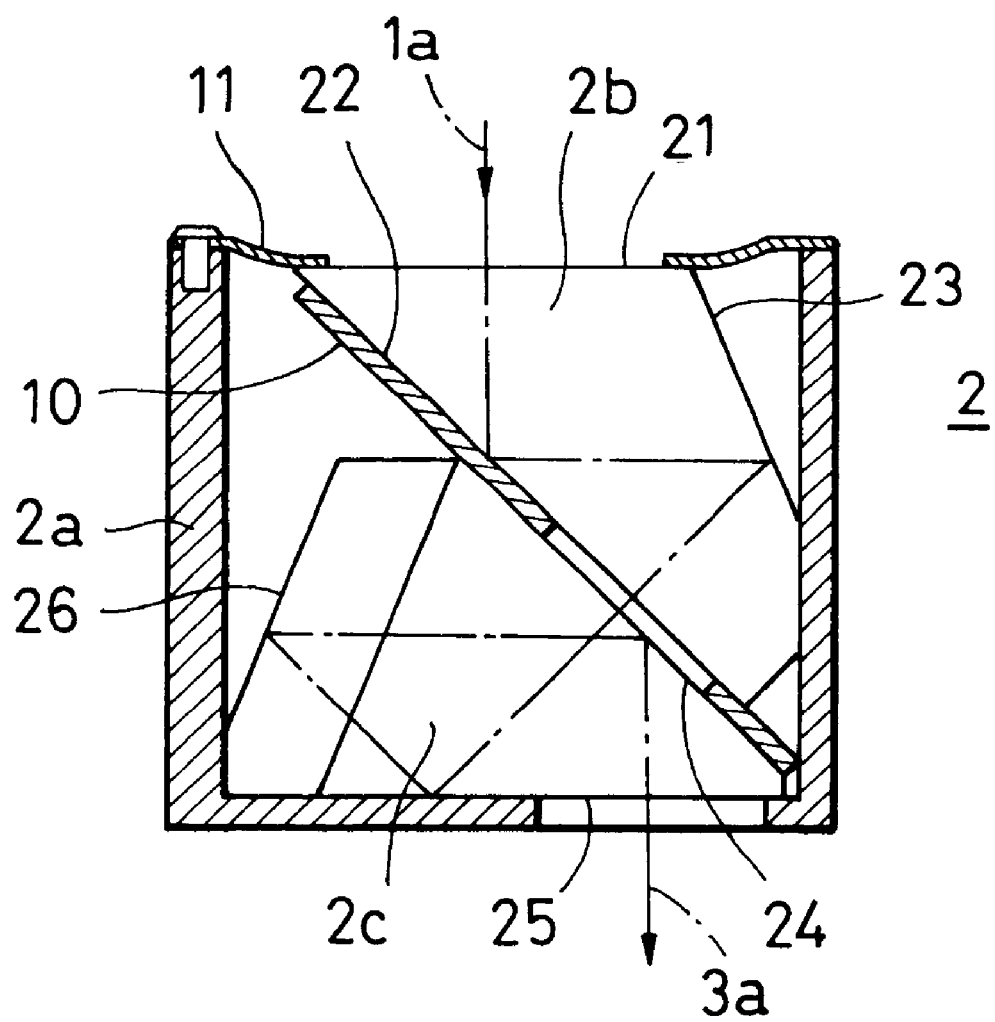
FIG. 3 is a sectional view of an erecting prism unit of the binoculars according to the same embodiment.

FIG. 1 is a cross sectional view of binoculars provided with a shake correcting function according to an embodiment of the present invention. FIG. 2 is a block diagram of the essential portion of the binoculars shown in FIG. 1. FIG. 3 is a partial view of the binoculars shown in FIG. 1. FIG.

4 is an exploded perspective view of the binoculars shown in FIG. 3. Referring to FIGS. 1 to 4, the binoculars include objectives 1, optical axes 1a of the respective objectives 1 (optical axes along which incident light travels), erecting prism units 2, eyepieces 3, optical axes 3a of the eyepieces 3 (optical axes along which exit light travels), a main unit 4, a rear cover 5, an eyepiece rotating frame 6, a circuit substrate 7, shake sensors 7a, vertical-angle-variable prism units 8, vertical-angle-variable prisms 8a, and batteries 9. Among the respective elements described above, the objectives 1, the erecting prism units 2, the eyepieces 3, the vertical-angle-variable prism units 8 and the like, are all symmetrically paired with respect to the axis S.

With this construction, a light beam coming through the objectives 1 is relayed via the erecting prism units 2 and the eyepieces 3 so that an image formed by the objectives 1 can be observed through the eyepieces 3.

As shown in FIG. 3, each erecting prism unit 2 comprises an auxiliary prism 2b, a Schmidt prism 2c, a spacer 10, a leaf spring 11 for fixing the above-mentioned elements, and the like. The erecting prism unit 2 is securely mounted on the eyepiece rotating frame 6.

The auxiliary prism 2b is comprised of a first face 21 disposed perpendicular to the optical axis 1a along which the incident light travels, a second face 22 tilting at 45° with respect to the optical axis 1a, a third face 23 (reflecting surface) tilting at 22.5° with respect to the second face 22, and so on. The Schmidt prism 2c is formed of a first face 24 disposed perpendicular to the light beam exiting from of the auxiliary prism 2b, a second face 25 tilting at 45° with respect to the first face 24, a third face 26, i.e., a roof reflecting surface whose ridge forms an angle of 67.5° with a ridge of the second face 25. The auxiliary prism 2b and the Schmidt prism 2c constitute what is called the Pechan roof prism.

As illustrated in FIGS. 1 and 2, the vertical-angle-variable prism unit 8 and the circuit substrate 7 are disposed between the objective 1 and the erecting prism unit 2. The battery 9, serving as power supply for the circuit substrate 7 and the vertical-angle-variable prism 8, is disposed between a pair of objectives 1.

The eyepiece 3 is held by the eyepiece rotating frame 6 in such a manner that the optical axis 3a of the eyepiece 3 matches the optical axis of the exit light passing through each erecting prism 2. The rear cover 5 is attached to the main unit 4 holding a pair of objectives 1 therein. A pair of bearings 5a, which rotate around the optical axis 1a of each of the objectives 1, are provided for the rear cover 5 and rotatably hold each of the eyepiece rotating frames 6.

The construction of the shake correction system will now be explained with reference to FIG. 2. This system is comprised of a shake sensor 7a, a microcomputer 7b, a vertical-angle-variable prism 8a, a driving actuator 8b for the vertical-angle-variable prism 8a, a prism vertical angle sensor 8c and so on. The vertical-angle-variable prism 8a, the driving actuator 8b, the prism vertical angle sensor 8c and other elements partially constitute the vertical-angle-variable prism unit 8.

Only one side of the optical system of the binoculars is shown in FIG. 2, in reality, however, this system is provided for each of a pair of optical systems.

Referring to FIG. 2, the shake sensor 7a, which is a gyrosensor, mounted on the circuit substrate 7 is comprised of a pitch shake sensor for detecting pitch shake and a yaw sensor for detecting yaw shake, the two sensors being mounted on the circuit substrate 7 while the sensing axes of the respective sensors are orthogonal to each other. With this arrangement, the shake sensor 7a detects a deviation caused by shake (angular acceleration) and outputs the information as a signal to the microcomputer 7b.

The shake correcting operation will now be described. The microcomputer 7b receives the information on a deviation due to shake (angular acceleration) from the shake sensor 7a and simultaneously computes the prism vertical angle at which the possible image deviation due to shake can be corrected by changing the direction of the light beam passing through the vertical-angle-variable prism 8a. At the same time, the prism driving actuator 8b is started to change the vertical angle of the prism 8a.

The prism vertical angle sensor 8c measures the vertical angle of the prism 8a and outputs it to the microcomputer 7b. If this vertical angle coincides with the value computed by the microcomputer 7b, the microcomputer 7b exerts control over the prism driving actuator 8b to bring it to a stop.

An explanation will further be given of the operation of this embodiment. The objectives 1 form an image of a subject placed in front of the observer in a position at the rear of the objectives 1 and substantially in the position at the front focus of the eyepieces 3. For this image formation, the light beam coming along each optical axis 1a of the objective 1 (optical axis light beam) perpendicularly impinges on the first face 21 of the auxiliary prism 2b and is totally reflected on the second face 22 so as to be deflected at 90°. Subsequently, after the optical axis light beam is reflected on the third face (reflection surface) 23, it perpendicularly passes through the second face 22 to exit from the auxiliary prism 2b and strikes on the first face 24 of the Schmidt prism 2c. Then, the light beam is further incident on the second face 25 at an angle of 45° and is totally reflected twice. The light beam then perpendicularly passes through the second face 25 to finally exit from the Schmidt prism 2c.

During the above-described operation of the prism unit 2, since the light beam in the plane of FIG. 1 is reflected five times, the image formed by the objectives 1 is reversed from side to side. On the other hand, the light beam in the vertical direction of the plane of FIG. 1 is reversed upside down on the roof reflection surface 26, with the result that the overall image formed by the objectives 1 is also reversed upside down.

Any binocular shake is corrected by deflecting the entire light beam in a manner similar to the above-described shake corrected by use of the vertical-angle-variable prism unit 8 located at the rear of the objectives 1.

The subject image formed as an erect image substantially in a position of the front focuses of the eyepieces 3 is enlarged by the eyepieces 3 to form a virtual image that will be observed by the user.

In this embodiment the optical axis 1a along which a beam passes and impinges on the auxiliary prism 2b (at the center of the light beam) and the optical axis 3a along which the beam travels and ejects from the Schmidt prism 2c (at the center of the light beam) are spaced eccentrically away from each other at a distance of 10 mm. This means that the axis extending from the optical axis 1a of the objective 1 is intentionally displaced from the optical axis 3a of the eyepiece 3. With this arrangement, the eyepiece rotating frame 6 is rotated so that the eyepiece 3 located eccentrically decentered from the optical axis 1a of the objective 1 in an amount of 10 mm moves on a circumference 10 mm in radius around the optical axis 1a. Accordingly, the spacing between the left and right eyepiece 3 can be adjusted in a range at a maximum of 40 mm by rotating the respective lens frames 6.

Figure 4:
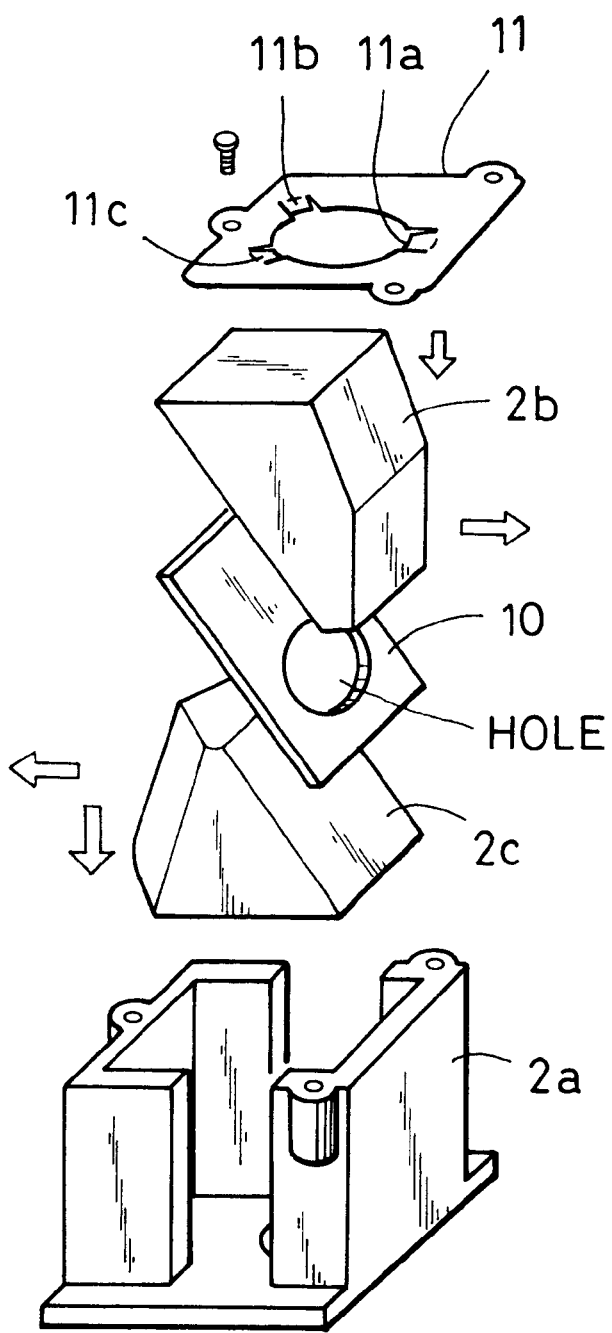
FIG. 4 is an exploded perspective view of the erecting prism unit according to the same embodiment.
Figure 5:
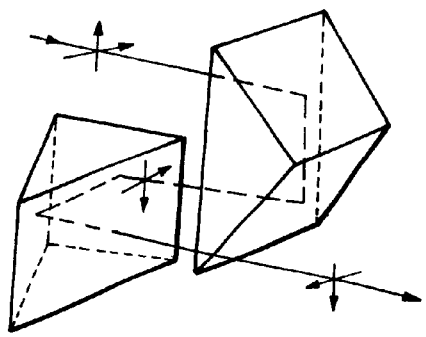
FIG. 5 illustrates the Porro I-type prism.
Figure 6:
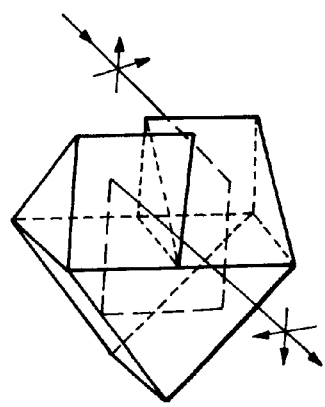
FIG. 6 illustrates the Porro II-type prism.
Figure 7:
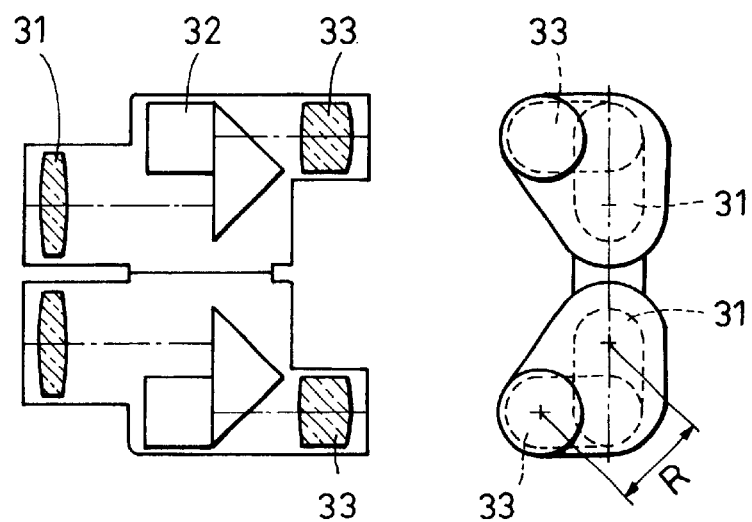
FIG. 7 illustrates an adjustment of the eyepiece width employed in conventional binoculars.
Figure 8:
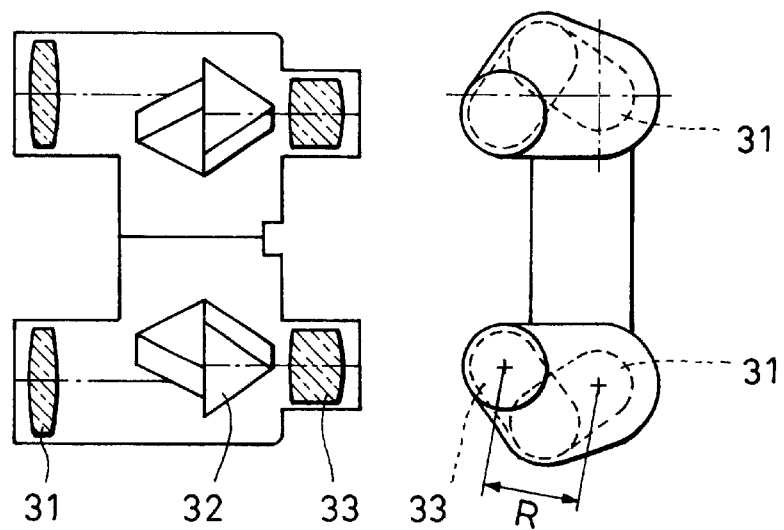
FIG. 8 illustrates an adjustment of the eyepiece width employed in conventional binoculars.

A description will further be given of a sectional view of the erecting prism unit 2 shown in FIG. 3 and an exploded perspective view of the erecting prism unit 2 illustrated in FIG. 4. Referring to FIG. 3, the spacer 10 intervenes between the respective inclined faces of the Schmidt prism 2c and the auxiliary prism 2b accommodated in the prism casing 2a and all the elements are securely held by the leaf spring 11. The spacer 10 is bored not to block the optical passage of the prism and not to contact the total reflecting portions of the prisms.

In FIG. 4, the respective prisms that are vertically pressed by way of claws 11a, 11b and 11c generate component forces in the horizontal direction as indicated by the arrows shown in FIG. 4. The prisms are thus located by pressing against the lateral walls of the prism casing 2a.

The leaf spring 11, serving to hold the prisms, may be a metal leaf spring, a coil spring, or a spring utilizing the elasticity of plastics or rubber. For securer attachment of the prisms to the casing 2a, an adhesive may preferably be used together with the leaf spring 11.

In this embodiment the erecting prism unit is comprised of Pechan prisms formed by a combination of the auxiliary prism 2b and the Schmidt prism 2c. With this construction, the distance between the optical axis 1a along which the incident light travels and the optical axis 3a along which the exit light passes can be set as desired by varying the dimensions of at least one of the auxiliary prism 2b and the Schmidt prism 2c, or alternatively, by changing the relative positions of the prisms. For example, in FIG. 3, the second face 25 of the Schmidt prism 2c is moved upward, or the Schmidt prism 2c is moved along the spacer 10 in the upper left direction, thereby reducing the distance between the optical axis 1a along which the incident light travels and the optical axis 3a along which the exit light passes to less than 10 mm. It should be noted that a distance smaller than 3 mm between those optical axes 1a and 3a hampers the sufficient adjustments of the eyepiece width even by rotating the eyepiece rotating frames. Thus, the optical axes 1a and 3a are preferably separated at a spacing of 3 mm or greater.

According to this embodiment, in binoculars whose two objectives are separated apart with a fixed spacing, the space formed between the two objectives can be effectively utilized. The eyepiece width can be adjusted merely by rotating the eyepiece rotating portions, thereby enhancing the sufficient use of the entire space within the main unit of the binoculars. Thanks to these advantages, the overall binoculars provided with the shake correcting function and the like can be downsized.

Also, the dimensions (including the angle) of the Pechan prisms are varied so that the eyepiece width can be set as desired. This increases the flexibility of the arrangement of the optical parts and further enhances the easy provision of other types of functions.

The use of Pechan roof prisms for the erecting prism unit requires only an extremely small prism casing to store the prisms therein, thereby further downsizing the overall binoculars.

In some binoculars of the type in which the two objectives are spaced apart at a constant distance, the eyepiece width is adjusted by integrally rotating all the elements including the objectives and the eyepieces. In this type of binoculars, however, the rotation of the objectives makes it difficult to utilize the space between the objectives for other purposes.

As will be clearly understood from the foregoing description, the present invention offers the following advantages.

In binoculars in which two objectives are separated apart with a fixed spacing and adjustments of the eyepiece width are not made by rotating the objectives, the spacing between the two eyepieces (eyepiece width) can be changed merely by rotating the eyepiece rotating portions. This enables the effective use of the space within the main unit of the binoculars. As a consequence, downsizing is possible for the overall binoculars even provided with a built-in shake correcting function, an autofocus function and so on.

Although roof prisms are used for erecting prisms, adjustments of the eyepiece width can be made merely by varying the dimensions of the Pechan prisms and by the rotation of the eyepieces without requiring another type of optical member, such as rhomboid prisms.

Further, in binoculars provided with two objectives spaced apart at a fixed distance, only a smaller prism chamber is required to store the prisms therein, thereby enhancing the ease of operation.

Additionally, only one elastic member is needed for performing easy and positive locating and fixing of the respective prisms, which are comprised of the Pechan roof prisms, to the prism casing.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. Binoculars comprising:

a pair of objective units for forming an image, said pair being separated with a fixed spacing;

a pair of erecting prism units for transforming the image received from said pair of objective units to an erect image, each of said pair of erecting prism units comprising a Pechan roof prism having a roof face, a disparity of at least 3 mm existing between a luminous flux center incident on each of said pair of erecting prisms and an optical axis along which light exits from each of said pair of erecting prisms, each one of said pair of erecting prism units rotating around an optical axis of a corresponding one of said pair of objective units;

a pair of eyepiece units receiving the erect image from said erecting prism units, respectively, each of said pair of eyepiece units being rotatable, with a corresponding one of said pair of erecting prism units, around an optical axis of a corresponding one of said pair of objective units;

a pair of vertical-angle-variable prisms, each one of said pair of vertical-angle-variable prisms being disposed between an objective unit of said pair of objective units and a corresponding erecting prism unit of said pair of erecting prism units;

a microcomputer;

a pair of shake sensors, each comprising a gyrosensor comprising a pitch shake sensor and a yaw shake sensor, and each for detecting a deviation caused by shake and sending a signal indicative of the deviation to said microcomputer;

a pair of prism vertical angle sensors, each for measuring a vertical angle of a corresponding one of said pair of vertical-angle-variable prisms;

a pair of driving actuators, each for driving a corresponding one of said pair of vertical-angle-variable prisms in response to a signal from said microcomputer based on a computation by said microcomputer of a prism vertical angle of said pair of vertical-angle-variable prisms for correcting image deviation, wherein each driving actuator of said pair of driving actuators is controlled by said microcomputer to stop driving the corresponding one of said pair of vertical-angle-variable prisms when said prism vertical angle sensor measures a vertical angle coinciding with the correct prism vertical angle computed by said microcomputer; and a battery disposed between said pair of objective units for supplying power to said pair of driving actuators, wherein each erecting prism unit of said pair of erecting prism units comprises a Pechan roof prism, comprising an auxiliary prism and a Schmidt prism, a spacer, and only one elastic member, wherein said spacer is disposed between said auxiliary prism and said Schmidt prism and has a single bored hole so that said spacer does not block optical passages of said auxiliary prism and said Schmidt prism and so that said spacer does not contact total reflecting portions of said auxiliary prism and said Schmidt prism, and wherein said auxiliary prism is disposed to receive light from a corresponding one of said pair of objective units, and said Schmidt prism is disposed to receive light from said auxiliary prism and direct the light to a corresponding one of said pair of eyepiece units, wherein each of said auxiliary prism and said Schmidt prism are planar prisms, and wherein the disparity existing between a luminous flux center incident on each of said pair of erecting prisms and an optical axis along which light exits from each of said pair of erecting prisms is effected by varying dimensions of at least one of said auxiliary prism and said Schmidt prism, wherein said auxiliary prism includes a first face disposed perpendicular to the optical axis along which incident light travels, a second face tilting at 45 degrees with respect to the optical axis, and a third reflecting face tilting at 22.5 degrees with respect to the second face, and said Schmidt prism includes a first face disposed perpendicular to the optical axis of said auxiliary prism, a second face tilted at 45 degrees with respect to the first face, and a third face comprising a roof reflecting surface whose ridge forms an angle of 67.5 degrees with a ridge of the second face, wherein each of said pair of erecting prism units is secured in a respective prism casing by the respective only one elastic member, said elastic member having a plurality of claws that press said respective prism unit against lateral walls of the prism casing, wherein, for each of said pair of eyepiece units, the optical axis thereof matches the optical axis along which light exits from the corresponding one of said pair of erecting prism units, wherein a distance between optical axes of said pair of objective units is larger than a distance between the optical axes of said pair of eyepiece units when said pair of eyepiece units are rotated to a closest possible position to one another, and wherein said objective units do not rotate when adjusting the distance between optical axes of said pair of eyepiece units.

2. Binoculars according to claim 1, wherein said elastic member is a leaf spring and has 3 claws in total, and wherein said respective prism unit is further secured inside the prism casing with adhesive.

3. Binoculars comprising:

a pair of objective units for forming an image, each of said pair of objective units having an axis, said pair of objective units being separated with a fixed spacing;

a pair of erecting prism units for transforming said image received from said pair of objective units to an erect image, each of said pair of erecting prism units consisting of a first prism having an incident face and a second prism having a light exiting face, wherein an optical axis incident on said incident face of said first prism and an optical axis, which exits from said light exiting face of said second prism are displaced, each one of said pair of erecting prism units being rotatable around an optical axis of a corresponding one of said pair of objective units;

a pair of eyepiece units receiving the erect image from said erecting prism units, respectively, each of said pair of eyepiece units being rotatable, with a corresponding one of said pair of erecting prism units, around an optical axis of a corresponding one of said pair of objective units;

a sensor for detecting the shake of said binoculars;

a pair of vertical-angle-variable prisms correcting the shake of said image from said pair of objective units that comes from the shake of said binoculars, wherein each of said pair of vertical-angle-variable prisms is placed between said pair of objective units and said pair of erecting prism units respectively and each of said vertical-angle-variable prisms slants an optical axis of light coming from each of said pair of objective units; and a drive actuator driving each of said pairs of vertical-angle-variable prisms so that each of said pair of vertical-angle-variable prisms slants an axis of light coming from each of said pair of objective units according to output from said sensor corresponding to the shake.

4. Binoculars according to claim 3, further comprising:

a battery giving power to said drive actuator.

5. Binoculars according to claim 4, wherein said battery, said sensor and said drive actuator are placed between each of the optical axes of each of said pair of objective units.

6. Binoculars comprising:

a pair of objective systems;

a pair of eyepiece systems;

a pair of erecting systems which reflects each light beam from said pair of objective systems so that the image observed by said pair of eyepiece systems becomes erect, and directs the light beam to said pair of eyepiece systems, wherein the incident axis of said light beam from said pair of objective systems deviates from the exit axis of the light beam to said pair of eyepiece systems in each of said pair of erecting systems, wherein each one of said pair of erecting systems is rotatable around an optical axis of a corresponding one of said pair of objective systems, and wherein each of said pair of eyepiece systems is rotatable, with a corresponding one of said pair of erecting systems, around the optical axis of a corresponding one of said pair of objective systems;

a correction system which is a part of said pair of objective systems, and which corrects a shake of image caused by a shake of said binoculars;

a sensor detecting a shake of said binoculars;

an actuator driving said correction system; and a controller controlling the driving of said actuator based on the output from said sensor.

7. Binoculars according to claim 6, wherein said correction system comprises a vertical-angle-variable prism.

8. Binoculars according to claim 6, wherein said pair of objective systems comprise an objective lens and a vertical-angle-variable prism.

* * * * *

UNITED STATES PATENT AND TRADEMARK OFFICE
CERTIFICATE OF CORRECTION

PATENT NO. : 6,549,337 B2
DATED : April 15, 2003
INVENTOR(S) : Toshimi Iizuka et al.

It is certified that error appears in the above-identified patent and that said Letters Patent is hereby corrected as shown below:

Column 3,
Line 29, "from of" should read -- from --.

Signed and Sealed this

Fourteenth Day of October, 2003

JAMES E. ROGAN
*Director of the United States Patent and Trademark Office*